United States Patent
Tian et al.

(10) Patent No.: US 10,186,885 B2
(45) Date of Patent: Jan. 22, 2019

(54) CHARGING METHOD AND APPARATUS FOR RECHARGEABLE BATTERY

(71) Applicant: Guangdong Oppo Mobile Telecommunications Corp., Ltd., Dongguan (CN)

(72) Inventors: Chen Tian, Dongguan (CN); Jun Zhang, Dongguan (CN); Jialiang Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 164 days.

(21) Appl. No.: 15/308,263

(22) PCT Filed: Sep. 24, 2015

(86) PCT No.: PCT/CN2015/090624
§ 371 (c)(1),
(2) Date: Nov. 1, 2016

(87) PCT Pub. No.: WO2017/049555
PCT Pub. Date: Mar. 30, 2017

(65) Prior Publication Data
US 2017/0271903 A1 Sep. 21, 2017

(51) Int. Cl.
*H01M 10/44* (2006.01)
*H01M 10/46* (2006.01)
*H02J 7/00* (2006.01)
*H01M 10/0525* (2010.01)
*H02J 7/04* (2006.01)

(52) U.S. Cl.
CPC ....... *H02J 7/0057* (2013.01); *H01M 10/0525* (2013.01); *H01M 10/44* (2013.01); *H02J 7/0077* (2013.01); *H01M 2220/30* (2013.01); *H02J 7/045* (2013.01)

(58) Field of Classification Search
CPC ........ H02J 7/007; H02J 7/0075; H02J 7/0081; H02J 7/0045

USPC .......................................... 320/124, 125, 160
See application file for complete search history.

(56) References Cited

U.S. PATENT DOCUMENTS

| 5,589,757 | A | 12/1996 | Klang |
| 5,633,576 | A | 5/1997 | Rose et al. |
| 9,190,863 | B2 | 11/2015 | Park et al. |
| 2011/0204850 | A1 | 8/2011 | Kaino |
| 2011/0267009 | A1* | 11/2011 | Nakatsuji ................ H01M 2/34 320/152 |
| 2011/0285359 | A1 | 11/2011 | Chang |
| 2012/0112703 | A1* | 5/2012 | Xu ........................ H02J 7/0022 320/145 |
| 2014/0084851 | A1* | 3/2014 | Park ......................... H02J 7/04 320/107 |
| 2017/0040817 | A1 | 2/2017 | Hu et al. |

FOREIGN PATENT DOCUMENTS

| CN | 101272060 A | 9/2008 |
| CN | 102163755 A | 8/2011 |
| CN | 103765725 A | 4/2014 |
| CN | 104953678 A | 9/2015 |
| CN | 105140985 B | 8/2017 |
| CN | 104833927 B | 12/2017 |
| EP | 2741395 A2 | 6/2014 |

OTHER PUBLICATIONS

Ding Li, Design of Fast Charge System of Battery Based on PWM Feedback Control, Instrument Technology, Jul. 31, 2011, p. 22-24, China.

* cited by examiner

*Primary Examiner* — Edward Tso
(74) *Attorney, Agent, or Firm* — Hodgson Russ LLP

(57) ABSTRACT

A charging method and an apparatus are provided. The charging method includes: constant-current charging the rechargeable battery until a voltage of the rechargeable battery reaches a first predetermined voltage; and charging the rechargeable battery with a gradually decreasing charging voltage until a charging process is completed. In this way, the capacity of a battery after being fully charged can be further increased while improving the charging speed.

17 Claims, 3 Drawing Sheets

CHARGING METHOD AND APPARATUS FOR RECHARGEABLE BATTERY

CROSS REFERENCE TO RELATED APPLICATION

This application is a U.S. National Phase Application of International Application No. PCT/CN2015/090624, entitled "CHARGING METHOD AND APPARATUS", which was filed on Sep. 24, 2015 and assigned to GUANGDONG OPPO MOBILE TELECOMMUNICATIONS CORP., LTD. The entire disclosure of the above application is incorporated herein by reference.

BACKGROUND

1. Field

The present disclosure relates to the field of charging, and in particular, to a charging method and apparatus.

2. Description of the Related Art

Currently, after a cell phone exits a constant-current charging mode and then enters a constant-voltage charging mode, the cell phone will be charged by setting a fixed charging cut-off voltage and waiting until a fully-charged condition is met. That is, when a charging integrated circuit (IC) detects that a difference between a voltage on a pin connected to a battery and the charging cut-off voltage is less than 100 mV and the charging current is less than a set charging cut-off current, the charging process will be stopped, and in this case, the battery is considered to be fully charged.

However, due to line loss, the voltage on the pin connected to the battery and detected by the charging IC is not equal to an actual battery voltage, and instead, it is less than the actual battery voltage, and consequently the battery is not actually fully charged (when fully charged, the voltage of the battery cell reaches the charging cut-off voltage). In view of this, in related technologies, by adding lines to compensate for line losses, i.e., by the method for increasing a set charging cut-off voltage, when the charging process is stopped, the cell can be actually fully charged although the voltage of the battery cell is less than the voltage of the pin connected to the battery and detected by the charging IC.

However, a compensation value produced by adding lines is a fixed value. The charging IC, being unaware of the voltage of the cell, cannot ensure that the battery can be actually fully charged. In addition, although the cut-off voltage is increased and the battery is thus comparatively charged more fully, charging duration is prolonged.

SUMMARY

Embodiments of the present disclosure provide a charging method and apparatus by which the capacity of a battery when the battery is fully charged is promised and the charging duration can be effectively shortened.

In a first aspect, a charging method is provided and includes: constant-current charging a rechargeable battery until a voltage of the rechargeable battery reaches a first predetermined voltage; and charging the rechargeable battery with a gradually decreasing charging voltage until a charging process is completed.

With reference to the first aspect, in a first possible implementation manner of the first aspect, charging the rechargeable battery with a gradually decreasing charging voltage until a charging process is completed includes: charging the rechargeable battery with a gradually decreasing charging voltage; and determining that the charging process is completed when a difference between a cell voltage of the rechargeable battery and the charging voltage is less than or equal to a predetermined threshold and a charging current is less than a predetermined current.

With reference to the first aspect or the first possible implementation manner of the first aspect, in a second possible implementation manner of the first aspect, charging the rechargeable battery with a gradually decreasing charging voltage includes: (a) constant-voltage charging, with the first predetermined voltage as a charging voltage, the rechargeable battery until the cell voltage of the rechargeable battery reaches a second predetermined voltage for a first time; (b) constant-voltage charging the rechargeable battery with a new charging voltage until the cell voltage of the rechargeable battery reaches the second predetermined voltage again, wherein the new charging voltage is less than the charging voltage applied when the cell voltage of the rechargeable battery reaches the second predetermined voltage in a previous instance; and (c) repeating the step (b).

With reference to the second possible implementation manner of the first aspect, in a third possible implementation manner of the first aspect, when the method is performed by a mobile terminal, the first predetermined voltage is a maximum voltage permitted by a charging integrated circuit (IC) of the mobile terminal.

With reference to the second or the third possible implementation manner of the first aspect, in a fourth possible implementation manner of the first aspect, the method further includes: monitoring the cell voltage of the rechargeable battery in real time; and determining, according to the cell voltage of the rechargeable battery monitored in real time, that the cell voltage of the rechargeable battery reaches the second predetermined voltage.

With reference to any one possible implementation manner of the second implementation manner to the fourth possible implementation manner of the first aspect, in a fifth possible implementation manner of the first aspect, the second predetermined voltage is a maximum voltage that the cell of the rechargeable battery can withstand.

With reference to any one possible implementation manner of the second implementation manner to the fifth possible implementation manner of the first aspect, in a sixth possible implementation manner of the first aspect, the new charging voltage is a difference between the charging voltage applied when the cell voltage of the rechargeable battery reaches the second predetermined voltage in the previous instance and a predetermined voltage difference.

With reference to any one possible implementation manner of the first implementation manner to the sixth possible implementation manner of the first aspect, in a seventh possible implementation manner of the first aspect, the predetermined threshold is 100 mV.

With reference to the first aspect or any one possible implementation manner of the first implementation manner to the seventh possible implementation manner of the first aspect, in an eighth possible implementation manner of the first aspect, the rechargeable battery is a lithium-ion battery.

In a second aspect, an apparatus is provided and includes: a constant-current charging unit configured to constant-current charge a rechargeable battery until a voltage of the rechargeable battery reaches a first predetermined voltage; and a constant-voltage charging unit configured to charge the rechargeable battery with a gradually decreasing charging voltage until a charging process is completed.

With reference to the second aspect, in a first possible implementation manner of the second aspect, for charging the rechargeable battery with a gradually decreasing charging voltage until a charging process is completed, the constant-voltage charging unit is configured to: charge the rechargeable battery with a gradually decreasing charging voltage; and determine that the charging process is completed when a difference between a cell voltage of the rechargeable battery and the charging voltage is less than or equal to a predetermined threshold and a charging current is less than a predetermined current.

With reference to the second aspect or the first possible implementation manner of the second aspect, in a second possible implementation manner of the second aspect, for charging the rechargeable battery with a gradually decreasing charging voltage, the constant-voltage charging unit is configured to execute: (a) constant-voltage charging, with the first predetermined voltage as a charging voltage, the rechargeable battery until the cell voltage of the rechargeable battery reaches a second predetermined voltage for the first time; (b) constant-voltage charging the rechargeable battery with a new charging voltage until the cell voltage of the rechargeable battery reaches the second predetermined voltage again, wherein the new charging voltage is less than the charging voltage applied when the cell voltage of the rechargeable battery reaches the second predetermined voltage in the previous instance; and (c) repeating the step (b).

With reference to the second possible implementation manner of the second aspect, in a third possible implementation manner of the second aspect, when the apparatus is a mobile terminal, the first predetermined voltage is a maximum voltage permitted by a charging integrated circuit (IC) of the mobile terminal.

With reference to the second or the third possible implementation manner of the second aspect, in a fourth possible implementation manner of the second aspect, the apparatus further includes: a cell voltage detection unit configured to monitor the cell voltage of the rechargeable battery in real time; and the cell voltage detection unit is also configured to determine whether the cell voltage of the rechargeable battery reaches the second predetermined voltage or not according to the cell voltage of the rechargeable battery monitored in real time.

With reference to any one possible implementation manner of the second implementation manner to the fourth possible implementation manner of the second aspect, in a fifth possible implementation manner of the second aspect, the second predetermined voltage is a maximum voltage that the cell of the rechargeable battery can withstand.

With reference to any one possible implementation manner of the second implementation manner to the fifth possible implementation manner of the second aspect, in a sixth possible implementation manner of the second aspect, the constant-voltage charging unit is configured to use a difference between the charging voltage applied when the cell voltage of the rechargeable battery reaches the second predetermined voltage in the previous instance and a predetermined voltage difference as the new charging voltage.

With reference to any one possible implementation manner of the first implementation manner to the sixth possible implementation manner of the second aspect, in a seventh possible implementation manner of the second aspect, the predetermined threshold is 100 mV.

With reference to the first aspect or any one possible implementation manner of the first implementation manner to the seventh possible implementation manner of the second aspect, in an eighth possible implementation manner of the second aspect, the rechargeable battery is a lithium-ion battery.

On the basis of the foregoing technical features, with regard to the charging method and apparatus provided by the embodiments of the present disclosure, after the rechargeable battery is constant-current charged so that a battery voltage reaches a predetermined voltage, the rechargeable battery is charged with a gradually decreasing charging voltage until a charging process is completed, so that the capacity of a battery is promised when the battery is fully charged.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF THE PREFERRED EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

It should be understood that the mobile terminal in the embodiments of the present disclosure can access a mobile communication network and/or Ethernet. The mobile terminal can make/pick up a phone call, send text messages and perform other types of mobile communication by the mobile communication network. The mobile communication network includes, but is not limited to: a Global System of Mobile Communication (GSM) network, a Code Division Multiple Access (CDMA) network, a Wideband Code Division Multiple Access (WCDMA) network, a Long Term Evolution (LTE) network, an LET Frequency Division Duplex (FDD) network, an LTE Time Division Duplex (TDD) network, and a 5G communication network in the future, and the like. The mobile terminal can upload or download data, for example, download applications, by the mobile communication network and/or Ethernet.

Figure 1:
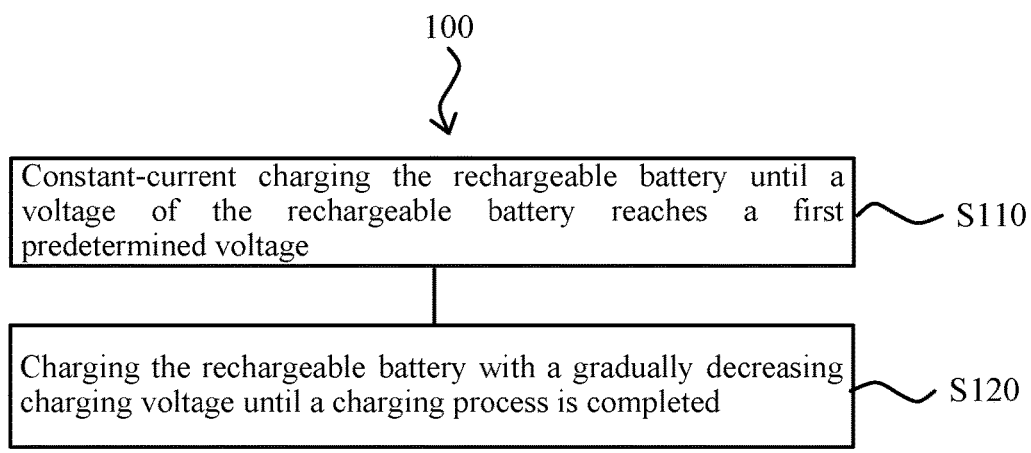
FIG. 1 is a schematic flowchart of a charging method according to an embodiment of the present disclosure.

FIG. 1 is a schematic flowchart of a charging method according to an embodiment of the present disclosure. As shown in FIG. 1, the method 100 can include followings.

At block S110, a constant-current charging includes that the rechargeable battery is constant-current charged until a voltage of the rechargeable battery reaches a first predetermined voltage.

At block S120, the rechargeable battery is charged with a gradually decreasing charging voltage until a charging process is completed.

With regard to the charging method of the embodiment of the present disclosure, after a battery voltage is constant-current charged to a predetermined voltage, the rechargeable battery is charged with a gradually decreasing charging voltage until a charging process is completed. In this way, a cell float voltage during the charging process can be reduced to increase a capacity of a battery when the battery is fully charged. In addition, by setting an appropriate voltage when the constant-current charging process ends, the duration for constant-current charging is increased and overall charging duration is reduced.

In the embodiment of the present disclosure, in order to improve service life of a battery, a voltage of the rechargeable battery can be detected first before the constant-current charging process. If the voltage of the rechargeable battery is too low, for example, in a lithium-ion battery, when the voltage is less than 3 V, the battery enters a constant-current charging stage after being pre-charged to 3V.

It should be understood that, in the embodiment of the present disclosure, the rechargeable battery is constant-current charged until the voltage of the rechargeable battery reaches the first predetermined voltage. The predetermined voltage can be regarded as a charging cut-off voltage in the related art. After constant-current charging, the rechargeable battery is constant-voltage charged. A charging voltage for constant-voltage charging is constantly decreased in the constant-voltage charging process. It can also be regarded that the charging cut-off voltage is constantly decreased in the constant-voltage charging stage.

A charging current of the constant-current charging can be any reasonable current set according to practical experience. For example, the charging current can be set to be 0.8 A or 1 A, which are commonly used currently. When the method 100 is performed by a mobile terminal, the charging current of the constant-current charging can also be set to be a maximum current permitted by design specifications of the mobile terminal, and is not limited in the present disclosure.

Furthermore, in block S110, the constant-current charging can include follows. First, a constant-current charging process is performed with a first predetermined current. Until the voltage of the rechargeable battery reaches the predetermined voltage for the first time, the current is appropriately decreased. The decreased current serves as the charging current for constant-current charging until the voltage of the rechargeable battery reaches the predetermined voltage again. The above process is repeated until the charging current is decreased to a second predetermined current. Then, the second predetermined current serves as the charging current to constant-current charge the rechargeable battery until the rechargeable battery reaches the charging cut-off voltage for the first time. Thereafter, the battery enters the constant-voltage charging and is charged in accordance with the proposals of the embodiments of the present disclosure. In this way, the charging duration can be reduced.

Still furthermore, when the method 100 is performed by a mobile terminal, the first predetermined voltage can be set to be any reasonable voltage less than or equal to the maximum voltage permitted by the charging integrated circuit (IC) of the mobile terminal. For example, as for a lithium-ion battery, the voltage can be set to be 4.4 V. The first predetermined voltage is a maximum voltage permitted by the charging IC. In this way, the duration for constant-current charging with a high current can be increased, thus reducing the overall charging duration.

Optionally, the block S120 is specified as follows: the rechargeable battery is charged with a gradually decreasing charging voltage, and the charging process is determined to be completed when a difference between a cell voltage of the rechargeable battery and the charging voltage is less than or equal to a predetermined threshold and the charging current is less than a predetermined current.

In other words, the condition for a completed charging process can be set as follows. When a difference between a cell voltage of the rechargeable battery and the charging voltage is less than or equal to a predetermined threshold and the charging current is less than a predetermined current. The predetermined current can be called a charging cut-off current. For example, the predetermined threshold can be set to be 100 mV. However, the predetermined threshold can also be set to be any other reasonable numerical values, for example, 50 mV, 70 mV, and the like. The charging cut-off current can be set according to practical experience. For example, the charging cut-off current can be set as 0.01 A, 0.1 A or the like, and is not limited in the present disclosure.

In the embodiment of the present disclosure, optionally, a charging duration in which a charging process is performed with a gradually decreasing charging voltage can be set. When a battery voltage is constant-current charged to the first predetermined voltage, a timing process starts, and until the set charging duration ends, the whole charging process ends.

Figure 2:
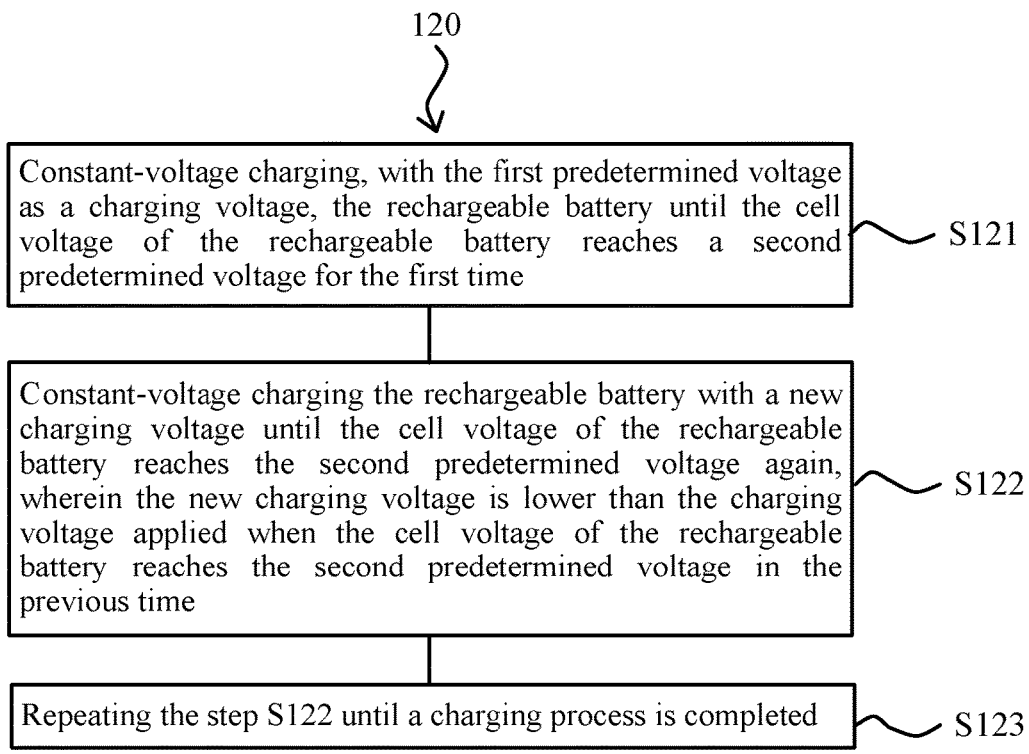
FIG. 2 is another schematic flowchart of the charging method according to the embodiment of the present disclosure.

In the embodiment of the present disclosure, as shown in FIG. 2, block S120 specifically includes the following.

At block S121, constant-voltage charging, with the first predetermined voltage as a charging voltage, the rechargeable battery is constant-voltage charged, with the first predetermined voltage as a charging voltage, until the cell voltage of the rechargeable battery reaches a second predetermined voltage for the first time.

At block S122, the rechargeable battery is constant-voltage charged with a new charging voltage until the cell voltage of the rechargeable battery reaches the second predetermined voltage again, wherein the new charging voltage is less than the charging voltage applied when the cell voltage of the rechargeable battery reaches the second predetermined voltage in the previous instance.

At block S123, the block S122 is repeated until the charging process is completed.

Since there are some line losses in the actual detected battery voltage in the charging process, the actual detected battery voltage is less than the actual battery voltage. Accordingly, when the detected battery voltage reaches the first predetermined voltage, the actual battery voltage does not reach the first predetermined voltage. Here, a constant-voltage charging process is performed with the first predetermined voltage serving as the charging voltage. In addition, every time when the cell voltage reaches the second predetermined voltage, the charging voltage is reduced once. That is, the charging cut-off voltage is reduced once, and a constant-voltage charging process is performed with the decreased charging voltage. The charging process is stopped until the battery is fully charged.

Optionally, in block S121, the second predetermined voltage can be any one reasonable voltage less than or equal to a maximum voltage that a cell of the rechargeable battery can withstand. The second predetermined voltage is a maximum voltage that a cell of a lithium-ion battery can withstand. For example, the maximum voltage that a cell of a lithium-ion battery which is commonly used currently can withstand is 4.35 V. The second predetermined voltage can be set as 4.35 V. In this way, the current for constant-voltage charging can be increased and the duration for constant-voltage charging can be reduced.

Optionally, in block S122, the new charging voltage is a voltage obtained by subtracting a predetermined voltage difference from the charging voltage applied when the cell voltage of the rechargeable battery reaches the second predetermined voltage in the previous instance.

Optionally, the predetermined voltage difference can be a tolerance number of a decreasing arithmetic progression between the first predetermined voltage and the second predetermined voltage. That is, the predetermined voltage difference is a fixed numerical value. For example, the predetermined voltage difference can be 16 mV, 24 mV and the like, but the present disclosure is not limited thereto.

It should be understood that the predetermined voltage difference can also be a variable. For example, when the cell voltage of the rechargeable battery reaches the second predetermined voltage for the first time, a corresponding voltage difference can be 24 mV. When the cell voltage of the rechargeable battery reaches the second predetermined voltage for the second time, the corresponding predetermined voltage difference might be 16 mV. When the cell voltage of the rechargeable battery reaches the second predetermined voltage for the third time, the corresponding predetermined voltage difference can be another numerical value different from 16 mV and 24 mV. The specific predetermined voltage difference can be determined according to an actual charging situation. For example, the predetermined voltage difference can be determined in such a way that the higher the numerical value of the times for which the cell voltage of the rechargeable battery reaches the second predetermined voltage is, the smaller the corresponding predetermined voltage difference is. However, the present disclosure is not limited thereto.

Furthermore, optionally, several fixed voltage ranges can be set. In the constant-voltage charging process, every time when it is detected that the cell voltage of the rechargeable battery reaches the second predetermined voltage, the charging voltage is decreased to a next range which is nearest to the voltage range used when the cell voltage reaches the second predetermined voltage in this time.

In the embodiment of the present disclosure, optionally, the cell voltage of the rechargeable battery can also be monitored in real time. Whether the cell voltage of the rechargeable battery reaches the second predetermined voltage or not is determined by the value of the cell voltage of the rechargeable battery monitored in real time.

Specifically, a terminal apparatus can monitor the cell voltage in real time by a voltmeter located in a cell of a battery; and the cell voltage can also be monitored by other methods, and the way of monitoring is not limited in the present disclosure.

In addition, the terminal apparatus may not monitor the cell voltage of the rechargeable battery in real time. In this case, a voltage comparison module can be provided inside the terminal apparatus, and a reference value of the voltage comparison module is set to be a fixed value. The terminal apparatus can determine whether the cell voltage of the rechargeable battery reaches the set value or not by an output signal from the voltage comparison module.

In the embodiment of the present disclosure, optionally, the rechargeable battery is a lithium-ion battery.

The charging method of the embodiments of the present disclosure will be described in detail below with reference to specific embodiments. These examples are provided to help persons skilled in the art better understand the embodiments of the present disclosure instead of limiting the scope of the embodiments of the present disclosure.

Figure 3:
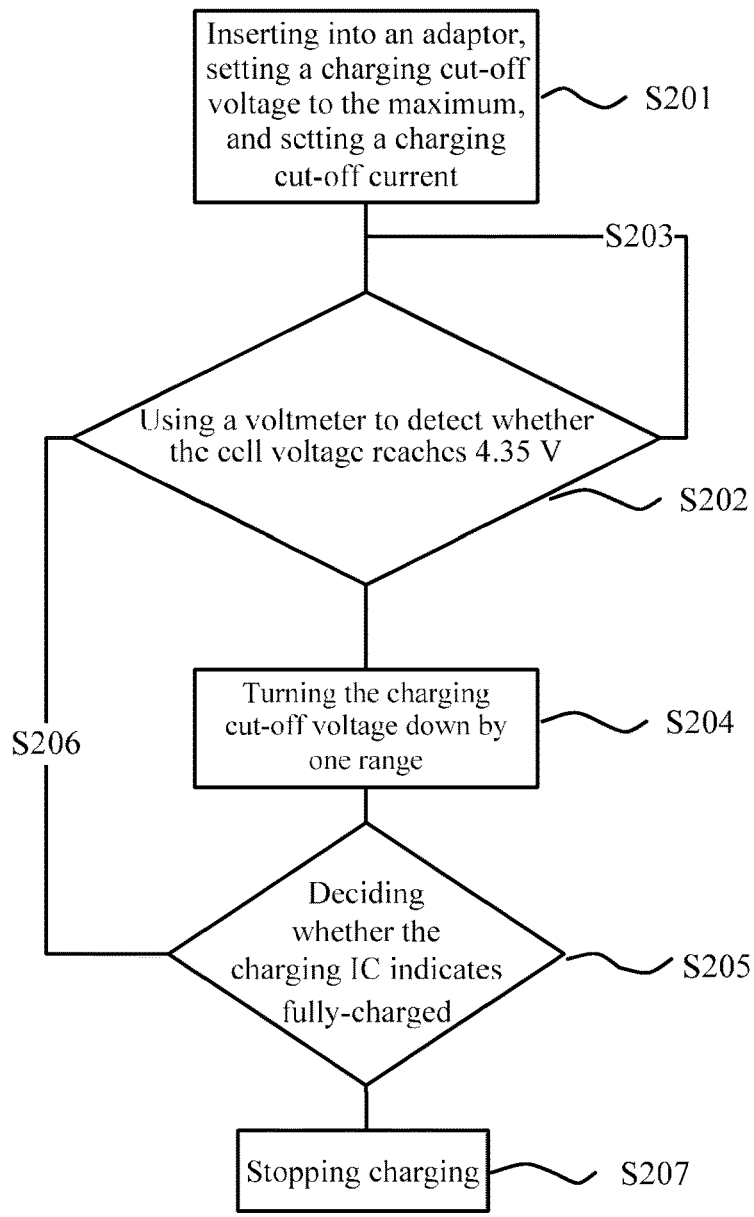
FIG. 3 is a schematic flowchart of the charging method according to another embodiment of the present disclosure.

FIG. 3 is a schematic flowchart of a charging method according to anther embodiment of the present disclosure. The method shown in FIG. 3 will be described with a lithium-ion battery which is currently commonly used as an example. As shown in FIG. 3, the method 200 includes follows.

At block S201, a mobile terminal is inserted into an adapter, a charging cut-off voltage is set to the maximum, and a charging cut-off current is set.

At block S202, a voltmeter is used by an application processor (AP) in the mobile terminal to detect whether the cell voltage reaches 4.35 V or not.

At block S203, the block S202 is repeated if the cell voltage does not reach 4.35 V.

At block S204, the charging cut-off voltage is reduced by one range by the mobile terminal.

At block S205, that whether the charging integrated circuit indicates fully-charged or not is decided by the mobile terminal.

At block S206, the block S202 and the subsequent blocks are repeated if the charging integrated circuit (IC) does not indicate fully-charged.

At block S207, the charging process is stopped if the charging integrated circuit indicates fully-charged.

With regard to the charging method of the embodiments of the present disclosure, after the battery voltage is constant-current charged to a predetermined voltage, the rechargeable battery is charged with a gradually decreasing charging voltage until a charging process is completed. In this way, the cell float voltage in the charging process can be reduced to increase the capacity of a battery when the battery is fully charged. In addition, by setting an appropriate voltage when the constant-current charging process ends, the duration for constant-current charging is increased and the overall charging duration is reduced.

Figure 4:
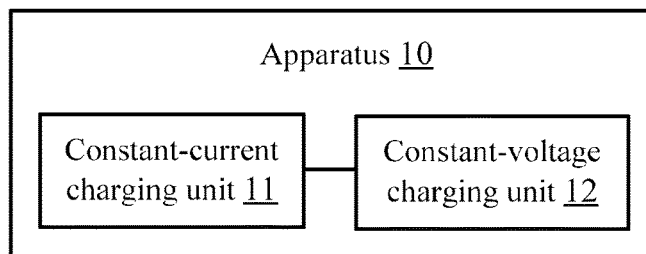
FIG. 4 is a schematic block diagram of an apparatus according to an embodiment of the present disclosure.

The apparatus of the embodiments of the present disclosure will be described in detail below with reference to FIG. 4. As shown in FIG. 4, the apparatus 10 includes a constant-current charging unit 11 and a constant-voltage charging unit 12.

The constant-current charging unit 11 is configured to constant-current charge the rechargeable battery until a voltage of the rechargeable battery reaches the first predetermined voltage.

The constant-voltage charging unit 12 is configured to charge the rechargeable battery with a gradually decreasing charging voltage until the charging process is completed.

The apparatus of the embodiments of the present disclosure, after constant-current charging the battery voltage to a predetermined voltage, charges the rechargeable battery with a gradually decreasing charging voltage until a charging process is completed. In this way, the cell float voltage in the charging process can be reduced to increase the capacity of the battery when the battery is fully charged. In addition, by setting an appropriate voltage when the constant-current charging process ends, the duration for constant-current charging is increased and the overall charging duration is reduced.

In the embodiment of the present disclosure, optionally, in the aspect of charging the rechargeable battery with a gradually decreasing charging voltage until the charging process is completed, the constant-voltage charging unit 12 is specifically configured to: charge the rechargeable battery with a gradually decreasing charging voltage; determine, when a difference between a cell voltage of the rechargeable battery and the charging voltage is less than or equal to a predetermined threshold and a charging current is less than a predetermined current, that the charging process is completed.

In the embodiment of the present disclosure, optionally, in the aspect of charging the rechargeable battery with a gradually decreasing charging voltage, the constant-voltage charging unit 12 is specifically configured to perform the following.

(a) the rechargeable battery is constant-voltage charged, with the first predetermined voltage as a charging voltage, until the cell voltage of the rechargeable battery reaches a second predetermined voltage for the first time;

(b) the rechargeable battery is constant-voltage charged with a new charging voltage until the cell voltage of the rechargeable battery reaches the second predetermined voltage again, wherein the new charging voltage is less than the charging voltage applied when the cell voltage of the rechargeable battery reaches the second predetermined voltage in the previous instance; and (c) the step (b) is repeated.

In the embodiment of the present disclosure, optionally, when the apparatus is a mobile terminal, the first predetermined voltage is a maximum voltage permitted by a charging integrated circuit (IC) of the mobile terminal.

Figure 5:
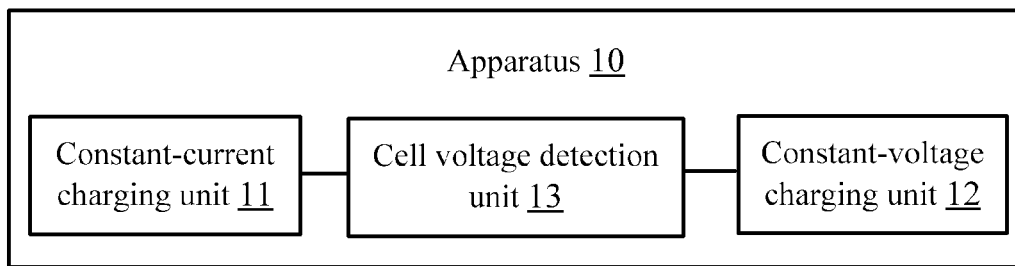
FIG. 5 is another schematic block diagram of the apparatus according to the embodiment of the present disclosure.

In the embodiment of the present disclosure, optionally, as shown in FIG. 5, the apparatus also includes a cell voltage detection unit 13.

The cell voltage detection unit 13 is configured to monitor the cell voltage of the rechargeable battery in real time.

The cell voltage detection unit 13 is also configured to determine whether the cell voltage of the rechargeable battery reaches the second predetermined voltage or not according to the cell voltage of the rechargeable battery monitored in real time.

In the embodiment of the present disclosure, optionally, the second predetermined voltage is a maximum voltage that the cell of the rechargeable battery can withstand.

In the embodiment of the present disclosure, optionally, the constant-voltage charging unit 12 is specifically configured to: use a difference between the charging voltage applied when the cell voltage of the rechargeable battery reaches the second predetermined voltage in the previous instance and a predetermined voltage difference as the new charging voltage.

In the embodiment of the present disclosure, optionally, the predetermined threshold is 100 mV.

In the embodiment of the present disclosure, optionally, the rechargeable battery is a lithium-ion battery.

It should be understood that the apparatus of the embodiments of the present disclosure can be used to carry out various processes implemented in the embodiments of the method of FIG. 1 and FIG. 2. In order to avoid repetition, those processes will not be repeated here.

The apparatus of the embodiments of the present disclosure charges, after the battery voltage is constant-current charged to a predetermined voltage, the rechargeable battery with a gradually decreasing charging voltage until the charging process is completed. In this way, a cell float voltage during the charging process can be reduced to increase the capacity of a battery when the battery is fully charged. In addition, by setting an appropriate voltage when the constant-current charging process ends, the duration for constant-current charging is increased and the overall charging duration is reduced.

Persons of ordinary skill in the art may realize that, units and algorithm steps of each example described in combination with the embodiments disclosed here may be implemented by electronic hardware or a combination of computer software and electronic hardware. Whether these functions are executed in a hardware or software manner depends upon a particular application and design constraint condition of the technical solutions. Persons skilled in the art may use different methods to implement the described functions for each particular application, but the implementation should not be construed as beyond the scope of the present disclosure.

It can be clearly understood by persons skilled in the art that, for the purpose of convenient and brief description, for a detailed working process of the foregoing system, device and unit, reference may be made to a corresponding process in the method embodiments, and therefore no further details are provided herein.

In several embodiments provided in the present application, it should be understood that the disclosed system, device, and method may be implemented in other ways. For example, the described device embodiments are merely exemplary. For example, the unit division is merely logical function division and can be other division in actual implementation. For example, multiple units or components can be combined or integrated into another system, or some features can be ignored or not performed. Furthermore, the shown or discussed coupling or direct coupling or communication connection may be accomplished through some interfaces, and indirect coupling or communication connection between devices or units may be electrical, mechanical, or in other forms.

Units described as separate components may be or may not be physically separated. Components shown as units may be or may not be physical units; that is, the components may be integrated or distributed to a plurality of network units. Some or all of the modules may be selected to achieve the objective of the solution of the embodiment according to actual demands.

In addition, various functional units according to each embodiment of the present disclosure may be integrated in one processing module or may exist as various separate physical units, or two or more units may also be integrated in one unit.

When implemented in the form of a software functional unit and sold or used as an independent product, the functions may be stored in a computer readable storage medium. Based on such understanding, the nature of the technical solutions of the present disclosure, or a part that makes contribution to the prior art, or part of the technical solutions, may be embodied in the form of a software product. The computer software product is stored in a storage medium, and includes several instructions to enable a computer equipment (such as a personal computer, a server, or a network equipment) to perform all or part of the steps of the methods according to each embodiment of the present disclosure. The storage medium includes various media capable of storing program codes, such as a USB flash disk, a removable hard disk, a read-only memory (ROM, Read-Only Memory), a random access memory (RAM, Random Access Memory), a magnetic disk or a compact disk.

The foregoing descriptions are merely specific implementation manners of the present disclosure, but not intended to limit the protection scope of the present disclosure. Any

What is claimed is:

1. A charging method, comprising:
constant-current charging a rechargeable battery until a voltage of the rechargeable battery reaches a first predetermined voltage; and
charging the rechargeable battery with a gradually decreasing charging voltage until a charging process is completed; wherein
the step of charging the rechargeable battery with a gradually decreasing charging voltage until a charging process is completed comprises:
charging the rechargeable battery with a gradually decreasing charging voltage; and
determining that the charging process is completed when a difference between a cell voltage of the rechargeable battery and the charging voltage is less than or equal to a predetermined threshold and a charging current is less than a predetermined current.

2. The method as claimed in claim 1, wherein, charging the rechargeable battery with a gradually decreasing charging voltage comprises:
(a) constant-voltage charging the rechargeable battery with the first predetermined voltage as a charging voltage, until the cell voltage of the rechargeable battery reaches a second predetermined voltage for a first time;
(b) constant-voltage charging the rechargeable battery with a new charging voltage until the cell voltage of the rechargeable battery reaches the second predetermined voltage again, wherein the new charging voltage is less than the charging voltage applied when the cell voltage of the rechargeable battery reaches the second predetermined voltage in a previous instance; and
(c) repeating (b).

3. The method as claimed in claim 2, wherein, when the method is performed by a mobile terminal, the first predetermined voltage is a maximum voltage permitted by a charging integrated circuit (IC) of the mobile terminal; and the method further comprises:
monitoring the cell voltage of the rechargeable battery in real time; and
determining, according to the cell voltage of the rechargeable battery monitored in real time, that the cell voltage of the rechargeable battery reaches the second predetermined voltage.

4. The method as claimed in claim 2, wherein, when the method is performed by a mobile terminal, the first predetermined voltage is a maximum voltage permitted by a charging integrated circuit (IC) of the mobile terminal.

5. The method as claimed in claim 2, further comprising:
monitoring the cell voltage of the rechargeable battery in real time; and
determining, according to the cell voltage of the rechargeable battery monitored in real time, that the cell voltage of the rechargeable battery reaches the second predetermined voltage.

6. The method as claimed in claim 2, wherein, the second predetermined voltage is a maximum voltage that the cell of the rechargeable battery can withstand.

7. The method as claimed in claim 2, wherein the new charging voltage is a difference between the charging voltage applied when the cell voltage of the rechargeable battery reaches the second predetermined voltage in the previous instance and a predetermined voltage difference.

8. The method as claimed in claim 1, wherein the predetermined threshold is 100 mV.

9. The method as claimed in claim 1, wherein the rechargeable battery is a lithium-ion battery.

10. An apparatus, comprising:
a constant-current charging unit configured to constant-current charge a rechargeable battery until a voltage of the rechargeable battery reaches a first predetermined voltage; and
a constant-voltage charging unit configured to charge the rechargeable battery with a gradually decreasing charging voltage until a charging process is completed; wherein
when charging the rechargeable battery with a gradually decreasing charging voltage until a charging process is completed, the constant-voltage charging unit is configured to:
charge the rechargeable battery with a gradually decreasing charging voltage; and
determine that the charging process is completed when a difference between a cell voltage of the rechargeable battery and the charging voltage is less than or equal to a predetermined threshold and a charging current is less than a predetermined current.

11. The apparatus as claimed in claim 10, wherein, when charging the rechargeable battery with a gradually decreasing charging voltage, the constant-voltage charging unit is configured to execute:
(a) constant-voltage charging the rechargeable battery with the first predetermined voltage as a charging voltage, until the cell voltage of the rechargeable battery reaches a second predetermined voltage for a first time;
(b) constant-voltage charging the rechargeable battery with a new charging voltage until the cell voltage of the rechargeable battery reaches the second predetermined voltage again, wherein the new charging voltage is less than the charging voltage applied when the cell voltage of the rechargeable battery reaches the second predetermined voltage in a previous instance; and
(c) repeating (b).

12. The apparatus as claimed in claim 11, wherein, when the apparatus is a mobile terminal, the first predetermined voltage is a maximum voltage permitted by a charging integrated circuit (IC) of the mobile terminal.

13. The apparatus as claimed in claim 11, wherein the apparatus further comprises:
a cell voltage detection unit configured to monitor the cell voltage of the rechargeable battery in real time; and
the cell voltage detection unit is also configured to determine whether the cell voltage of the rechargeable battery reaches the second predetermined voltage or not according to the cell voltage of the rechargeable battery monitored in real time.

14. The apparatus as claimed in claim 11, wherein the second predetermined voltage is a maximum voltage that the cell of the rechargeable battery can withstand.

15. The apparatus as claimed in claim 11, wherein the constant-voltage charging unit is configured to:
use a difference between the charging voltage applied when the cell voltage of the rechargeable battery reaches the second predetermined voltage in the previous instance and a predetermined voltage difference as the new charging voltage.

16. The apparatus as claimed in claim 10, wherein the predetermined threshold is 100 mV.

17. The apparatus as claimed in claim 10, wherein the rechargeable battery is a lithium-ion battery.

* * * * *